US011523060B2

(12) United States Patent
Okamoto

(10) Patent No.: US 11,523,060 B2
(45) Date of Patent: Dec. 6, 2022

(54) DISPLAY DEVICE, IMAGING DEVICE, OBJECT MOVING METHOD, AND RECORDING MEDIUM

(71) Applicant: Teppei Okamoto, Tokyo (JP)

(72) Inventor: Teppei Okamoto, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 284 days.

(21) Appl. No.: 16/697,926

(22) Filed: Nov. 27, 2019

(65) Prior Publication Data
US 2020/0177821 A1 Jun. 4, 2020

(30) Foreign Application Priority Data

Nov. 29, 2018 (JP) .............................. JP2018-224201
Nov. 29, 2018 (JP) .............................. JP2018-224202

(51) Int. Cl.
*H04N 5/232* (2006.01)
*G06F 3/0488* (2022.01)
*G06F 3/0484* (2022.01)
*G06F 3/04886* (2022.01)
*G06F 3/04845* (2022.01)

(52) U.S. Cl.
CPC ... *H04N 5/232935* (2018.08); *G06F 3/04845* (2013.01); *G06F 3/04886* (2013.01); *H04N 5/232127* (2018.08); *H04N 5/232945* (2018.08); *G06F 2203/04803* (2013.01)

(58) Field of Classification Search
CPC ....... H04N 5/232935; H04N 5/232127; H04N 5/232945; G06F 3/04845; G06F 3/04886; G06F 2203/04803; G06F 3/0488
See application file for complete search history.

(56) References Cited

U.S. PATENT DOCUMENTS 9,113,073 B2   8/2015  Ugawa
2004/0165010 A1*  8/2004  Robertson ............. G06F 3/0481
                                                             715/805
(Continued)

FOREIGN PATENT DOCUMENTS

JP   2001-159730   6/2001
JP   2009-008954   1/2009
(Continued)

OTHER PUBLICATIONS

Japanese Office Action for 2018-224201 dated Jun. 28, 2022.

*Primary Examiner* — Abdelaaziz Tissire
(74) *Attorney, Agent, or Firm* — IPUSA, PLLC

(57) ABSTRACT

A display device displays a display object on a display part, controls a display on the display part, detects an indicator contacts the display part, and determines an input operation to the display part based on a detection result in the detecting. The display includes a first region being a detectable region and a second region being a part of the first region and a movable region where the display object moves according to the input operation. When a tap operation is detected, the display object is moved to coordinates of the tap operation being in the second region, and the display object is not moved toward coordinates of the tap operation being outside the second region. When a drag operation is detected, the display object is moved within the second region in accordance with a coordinate change due to the drag operation in the first region.

8 Claims, 16 Drawing Sheets

(56) References Cited

U.S. PATENT DOCUMENTS

| | | | | |
|---|---|---|---|---|
| 2008/0002028 A1* | 1/2008 | Miyata | ............... | H04N 5/23212 |
| | | | | 348/169 |
| 2009/0003817 A1* | 1/2009 | Suzuki | ............ | H04N 5/232127 |
| | | | | 348/346 |
| 2009/0244357 A1* | 10/2009 | Huang | ............ | H04N 5/232127 |
| | | | | 348/E5.024 |
| 2012/0113056 A1* | 5/2012 | Koizumi | .......... | H04N 5/232945 |
| | | | | 345/175 |
| 2015/0193110 A1 | 7/2015 | Takahashi | | |
| 2015/0304547 A1* | 10/2015 | Inoue | ................ | H04N 5/36961 |
| | | | | 348/349 |
| 2016/0165142 A1* | 6/2016 | Hada | ................ | H04N 5/232935 |
| | | | | 348/211.1 |
| 2018/0205874 A1* | 7/2018 | Funatsu | ........... | H04N 5/232122 |
| 2019/0199934 A1* | 6/2019 | Funatsu | ........... | H04N 5/232935 |
| 2020/0021748 A1* | 1/2020 | Funatsu | ............. | H04N 5/23296 |

FOREIGN PATENT DOCUMENTS

| JP | 5373229 | 12/2013 |
|---|---|---|
| JP | 2015-130016 | 7/2015 |
| JP | 2018-082747 | 5/2018 |
| JP | 2018082747 A * | 5/2018 |
| JP | 2018-117186 | 7/2018 |

\* cited by examiner

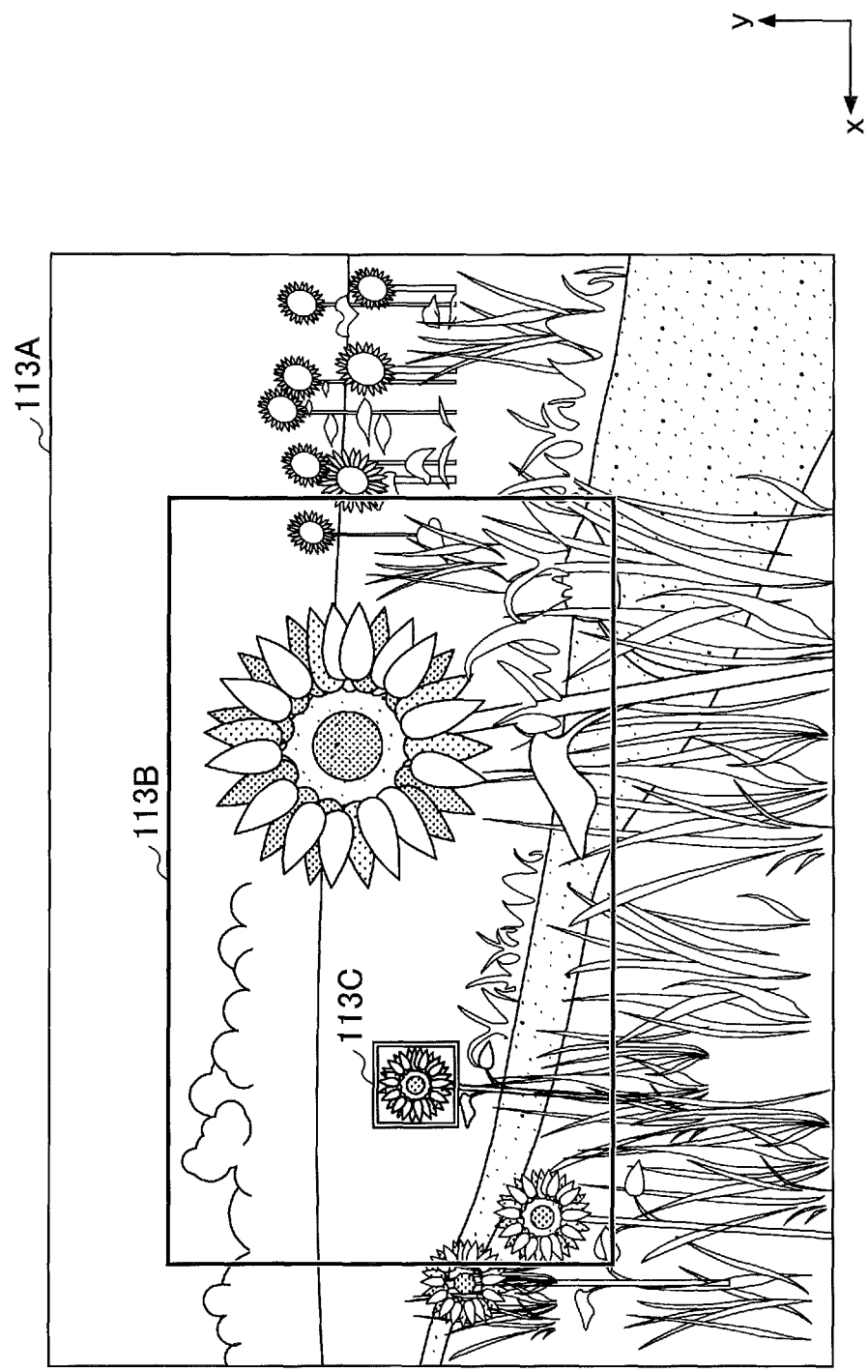

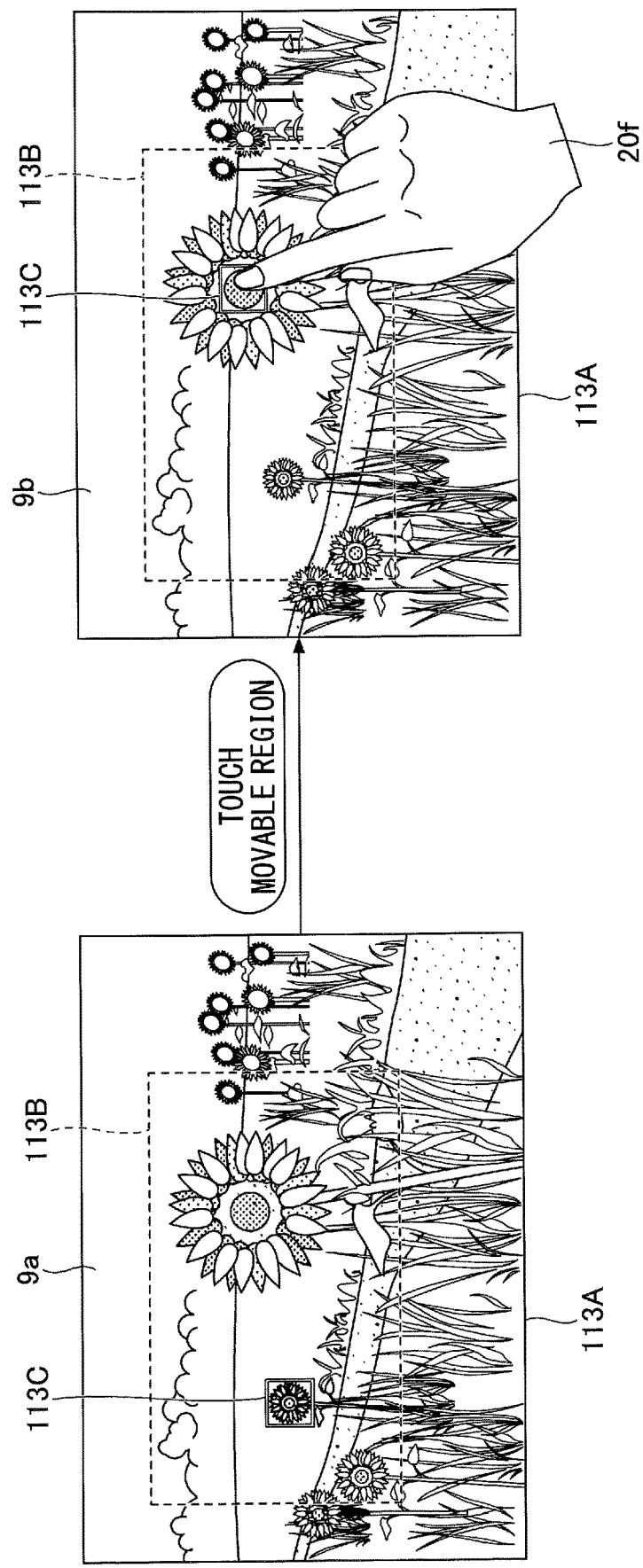

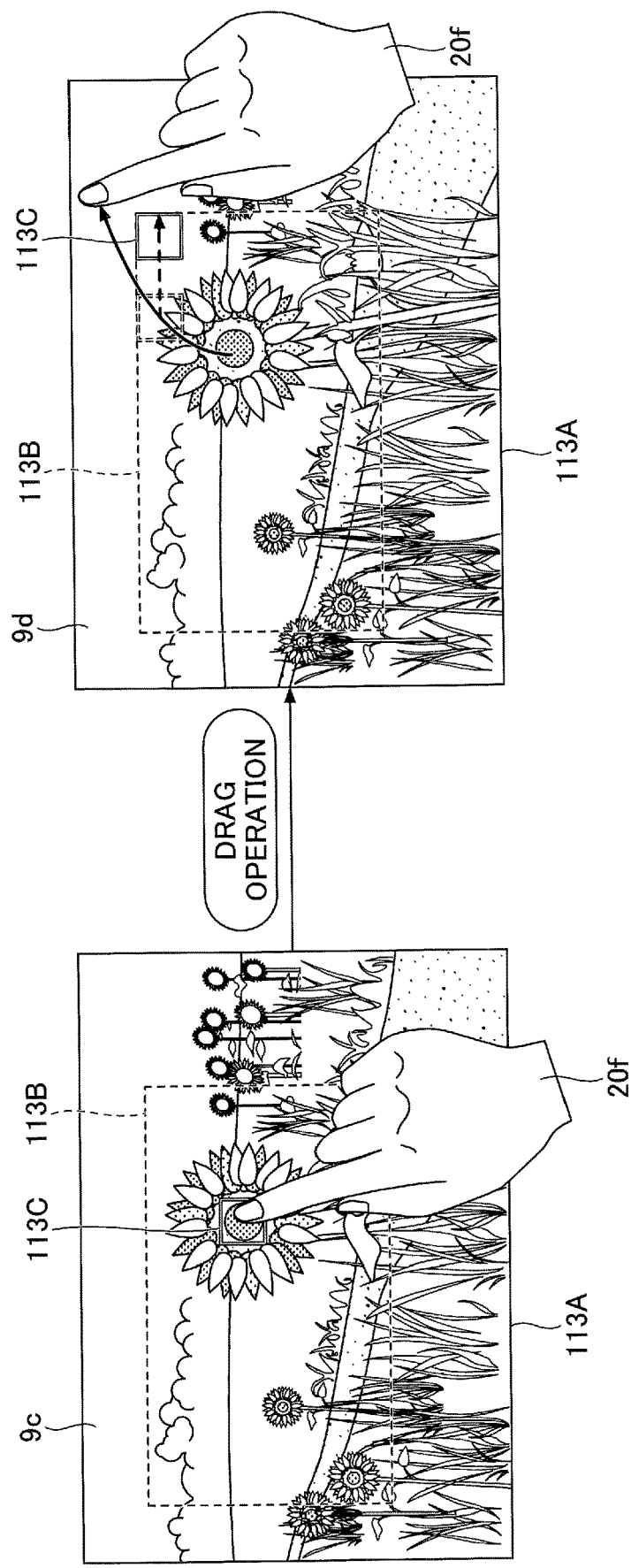

DISPLAY DEVICE, IMAGING DEVICE, OBJECT MOVING METHOD, AND RECORDING MEDIUM

CROSS-REFERENCE TO RELATED APPLICATION

The present application claims priority under 35 U.S.C. § 119 to Japanese Patent Applications No. 2018-224201 filed on Nov. 29, 2018, No. 2018-224202 filed on Nov. 29, 2018, the entire contents of which are incorporated herein by reference.

BACKGROUND OF THE INVENTION

1. Field of the Invention

The present invention is related to a display device, an imaging device, an object moving method, and a recording medium.

2. Description of the Related Art

An electronic device including an imaging device such as a digital camera includes a display device such as a touch panel, and is configured to perform various kinds of operations of the electronic device by moving a display object on a touch panel according to a contact operation of a user such as moving based on an absolute touch position (referred to as "tap operation" in this application) or moving based on a relative touch position (referred to as "drag operation" in this application).

SUMMARY OF THE INVENTION

In one aspect of this disclosure, a display device includes a memory; and a processor coupled to the memory, and configured to perform a process including displaying a display object on a display part, controlling a display on the display part, detecting a proximity or a contact of an indicator with the display part, and determining an input operation to the display part based on a detection result in the detecting, wherein the display includes a first region that is a detectable region in the detecting, a second region that is a part of the first region and is a movable region where the display object moves in accordance with the input operation, and wherein in a case in which the determining determines a tap operation on the display part, the controlling moves the display object to coordinates of the tap operation upon detecting the coordinates that are in the second region, and does not move the display object toward coordinates of the tap operation upon detecting the coordinates that are outside the second region, and in a case in which the determining determines a drag operation on the display part, the controlling moves the display object within the second region in accordance with a coordinate change due to the drag operation in the first region.

BRIEF DESCRIPTION OF THE DRAWINGS

In the following, embodiments of the present invention will be described with reference to the accompanying drawings.

FIG. 2 is a diagram illustrating an example of a configuration of a display screen of an image display LCD;

FIG. 3A is a diagram illustrating a movement pattern of a display object on a display device in the first embodiment;

FIG. 3B is a diagram illustrating another movement pattern of the display object on the display device in the first embodiment;

DESCRIPTION OF THE PREFERRED EMBODIMENTS

Figure 1:
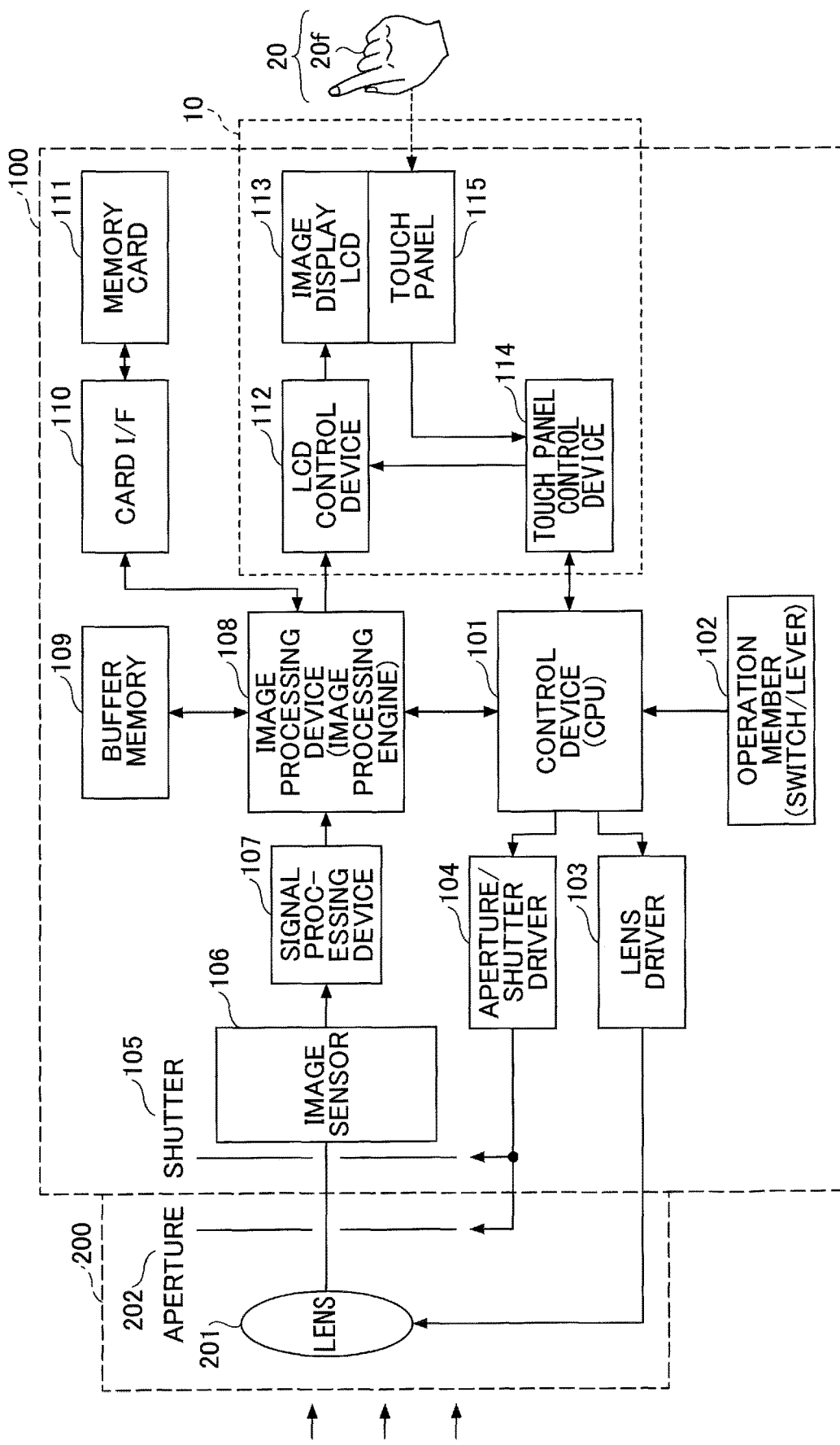
FIG. 1 is a diagram illustrating a basic hardware configuration of an interchangeable lens digital camera (imaging device)

In a technology for performing various kinds of operations of an electronic device by moving a display object on a touch panel according to a contact operation of a user, a display object is stopped, when a position at which a drag operation is sensed passes through a predetermined stop position or is close to a predetermined stop position (Japanese Laid-Open Patent Application No. 2015-130016, Japanese Patent No. 5373229). Consider a case where there is a limit to a movable area of the display object. In a case in which the display object is moved by dragging in a vicinity of a boundary of the movable area, if a trajectory of the drag operation exceeds the movable area even slightly, an unintended stop of movement occurs and the display object does not move as expected, resulting in a problem in which the operability of the touch operation is reduced.

In the following, embodiments according to the present invention will be described with reference to the accompanying drawings, regarding improvement of an operability of a touch operation of a user. In order to facilitate the understanding of the description, the same component elements in the drawings will be denoted by the same reference numerals as far as possible, and redundant description will be omitted.

First Embodiment

A first embodiment will be described with reference to FIG. 1 to FIG. 5. In the first embodiment, a lens interchangeable digital camera (imaging device) 100 will be described as a device having a display device 10.

FIG. 1 is a diagram illustrating a basic hardware configuration of the interchangeable lens digital camera (imaging device) 100. Hereinafter, the lens interchangeable lens digital camera 100 is simply referred to as the "digital camera 100". As depicted in FIG. 1, an interchangeable lens 200 is interchangeably attached to the digital camera 100. The operation of the digital camera 100 and the interchangeable lens 200 are controlled by a control device 101.

An operation member 102 is a member for a user to operate the digital camera 100, including specifically a shutter button, other switches, and a lever. When the a shutter button of the operation member 102 is operated, the control device 101 performs a focus adjustment (AF) of a lens 201 via a lens driver 103 to adjust opening and closing of an aperture 202 via an aperture/shutter driver 104 such that an exposure control (AE) and a shutter 105 are opened and closed.

Image signals, which are received and captured by an image sensor 106 through the interchange lens 200 by the opening and closing of the shutter 105, are sent to an image processing device 108 via a signal processing device 107. In a case in which a predetermined image process is performed in the image processing device 108, a buffer memory 109 is used as a temporary storage location for data during processing. Image data, which have completed image processing, are recorded in a removable memory card 111 connected to a card I/F 110.

The image data and various information items are displayed on an image display Liquid Crystal Display (LCD) 113 via an LCD control device 112. The image display LCD 113 is provided with a touch panel 115, and outputs touch data to a touch panel control device 114 upon detecting a contact or proximity of an indicator 20 such as a finger of the user or a touch pen. The touch panel control device 114 determines and controls a touch operation state based on an input from the touch panel 115. In addition to the operation member 102, various settings of the digital camera 100 are conducted by operating the touch panel 115.

The above described control device 101, the signal processing device 107, the image processing device 108, the LCD control device 112, and the touch panel control device 114 are implemented by hardware such as an integrated circuit including an LSI or the like.

Among components of the digital camera 100 described above, the LCD control device 112 (control unit), the image display LCD 113 (display unit), the touch panel control device 114 (determination unit), and the touch panel 115 (detection unit) form the display device 10 according to the first embodiment.

FIG. 2 is a diagram illustrating an example of a configuration of a display screen of the image display LCD 113. In the following description, a horizontal direction of the display screen is referred to as a x direction and a vertical direction is a y direction.

In a case in which the digital camera 100 is available for shooting, the image display LCD 113 displays a live view. A live view corresponds to a function that allows the image captured by the image sensor 106 to be displayed in real time on the image display LCD 113. The entire screen of this live view corresponds to an imaging range, which is an area allowed to be touched by a user. Hereinafter, this imaging region is referred to as "detectable region 113A" (first region). The user may specify a location for performing the focus adjustment in an auto-focus area frame, which is referred to as a display object 113C, displayed on the display screen. However, it may be difficult to adjust a focus in a peripheral portion of the detectable region 113A (imaging range) depending on a type of the interchangeable lens 200. Therefore, a range on the display screen is limited to a portion of the detectable range 113A (imaging range), specifically a narrow area including the image center of the display screen. Hereinafter, this range is referred to as the "movable region 113B" (second region) of the display object 113C. Accordingly, the movable area of the display object 113C (AF frame) is limited within this movable region 113B.

In FIG. 3A, FIG. 3B, FIG. 3C, and FIG. 7 pertinent to a display screen, which will be referred to, the movable region 113B is depicted slightly to left from a center of the detectable region 113A. However, it is preferable to arrange the movable region 113B at the center of the detectable region 113A such that a center position of the movable region 113B coincides with a center position of the detectable region 113A.

Figure 3C:
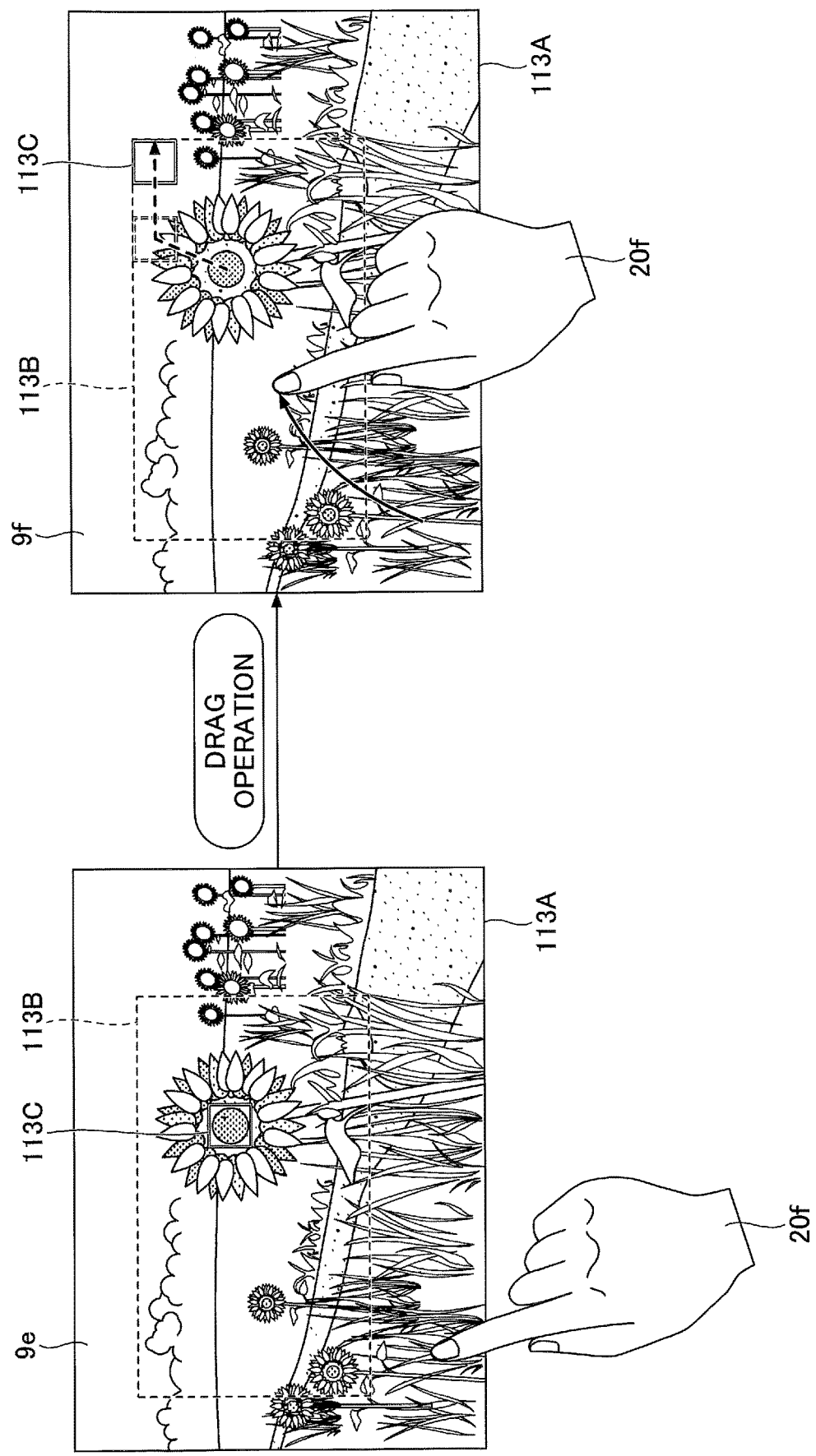
FIG. 3C is a diagram illustrating still another movement pattern of the display object on the display device in the first embodiment.

The display device 10 in the first embodiment is able to control a movement of the display object 113C in a case of performing a touch operation on the display screen of the digital camera 100. FIG. 3A to FIG. 3C are diagrams illustrating movement patterns of the display object 113C on the display device 10 in the first embodiment. In FIG. 3A to FIG. 3C, a trajectory of a finger 20f is illustrated with a thick solid arrow, and a trajectory of the display object 113C is illustrated with a thick dotted arrow.

As depicted in FIG. 3A, in a case of a touch operation within a movable region 113B, the display object 113C moves to absolute coordinates being touched. In the example of FIG. 3A, the display object 113C, which is positioned on a left side of the movable region 113B in a screen 9a before an operation, moves instantaneously to a position on a right side where the finger 20f of the user is touched on a screen 9b after the operation.

A movement of the display object 113C based on a successive chronological change in touch coordinates (trajectory of the drag operation) is conducted when the display object 113C is able to move relatively along the trajectory of the drag operation. However, when the display object 113C is not able to move relatively along the dragging trajectory beyond a boundary of the movable region 113B, the dragging trajectory moves only a X component in the x direction or a Y component in the y direction.

For example, as illustrated in FIG. 3B, in a case of the drag operation is conducted from a state, in which the finger 20f is disposed on the display object 113C in a screen 9c before the operation, to an outside of the movable region 113B as illustrated in a screen 9d after the operation, the display object 113C moves in the same trajectory as the drag operation in a first half of an operation as depicted in the screen 9d. When the display object 113c attains an upper end of the movable region 113B, the display object 113C is not able to move in the y direction any more. Therefore, the display object 113C moves in the x direction reflecting only the x component of the trajectory of the drag operation.

As depicted in FIG. 3C, even in a case in which the drag operation is conducted from a position distant from the display object 113C and outside the movable region 113B, the display object 113C is moved based on the drag operation as displayed in a screen 9f. That is, in a case in which an initial position of the display object 113C displayed in a screen 9e is the same as that displayed in the screen 9c, the trajectory of the display object 113C becomes the same as that displayed in the screen 9d in FIG. 3B, regardless of the initial position of the finger 20f.

Figure 4:
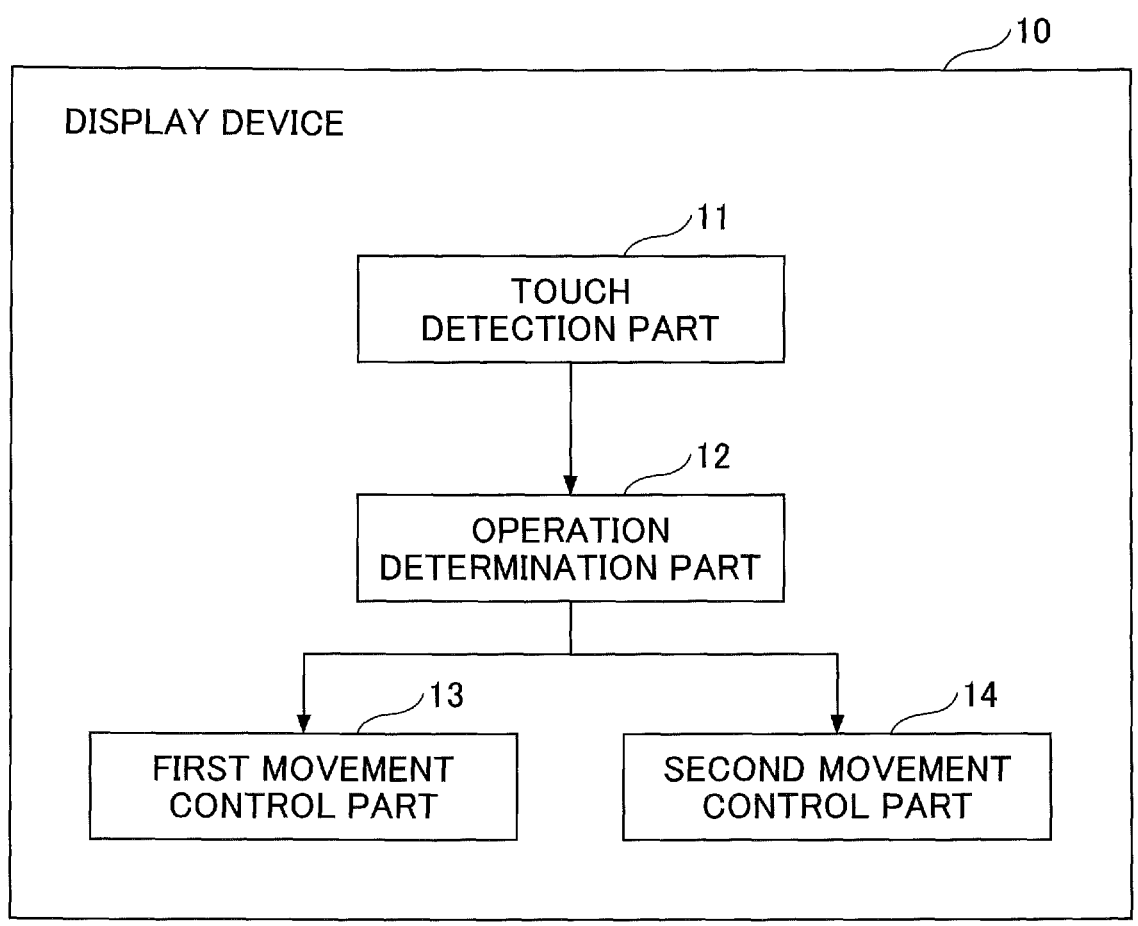
FIG. 4 is a diagram illustrating an example of a functional configuration of the display device in the first embodiment.

FIG. 4 is a diagram illustrating an example of a functional configuration of a display device 10 according to the first embodiment. As illustrated in FIG. 4, the display device 10 according to the first embodiment includes a touch detection part 11, an operation determination part 12, a first movement control part 13, and a second movement control part 14 as functions for realizing movement patterns of the display object 113C as illustrated in FIG. 3A to FIG. 3C.

The touch detection part 11 detects a proximity or a contact of the indicator 20 with the image display LCD 113 and the touch panel 115.

The operation determination part 12 determines an input operation to the image display LCD 113 and the touch panel 115 based on a detection result of the touch detection part 11. The operation determination part 12 determines whether the input operation is a tap operation or the drag operation.

The first movement control part 13 and the second movement control part 14 control an operation of the display object 113C on the image display LCD 113 based on an input operation. In a case in which the operation determination part 12 determines the tap operation on the image display LCD 113 and the touch panel 115, the first movement control part 13 moves the display object 113C to the coordinates when coordinates of the tap operation are within the movable region 113B, and the first movement control part 13 does not move the display object 113C to the coordinates when the coordinates of the tap operation are outside the movable region 113B.

In a case in which the drag operation on the image display LCD 113 or the touch panel 115 is determined by the operation determination part 12, the second movement control part 14 moves the display object 113C within the movable region 113B based on a coordinate change of the drag operation within the detectable region 113A.

The functions of the touch detection part 11, the operation determination part 12, the first movement control part 13, and the second movement control part 14 illustrated in FIG. 4 are realized by installing predetermined computer software (object movement program) on hardware such as a Large Scale Integration (LSI) realizing the LCD control device 112 and the touch panel control device 114 illustrated in FIG. 1, and operating the image display LCD 113 and the touch panel 115 under control of the LCD control device 112 and the touch panel control device 114. Also, the LCD control device 112 and the touch panel control device 114 forming the display device 10 is able to be expressed as a computer device including a Central Processing Unit (CPU) as a processor, a Random Access Memory (RAM), and a Read Only Memory (ROM). That is, the object movement program according to the first embodiment is executed on the computer, so that the display device 10 functions as the touch detection part 11, the operation determination part 12, the first movement control part 13, and the second movement control part 14 in FIG. 4.

More specifically, the touch detection part 11 is implemented by the touch panel 115 and the touch panel control device 114 illustrated in FIG. 1. The operation determination part 12 is implemented by the touch panel control device 114 illustrated in FIG. 1. The first movement control part 13 and the second movement control part 14 are implemented by the LCD control device 112.

Figure 5:
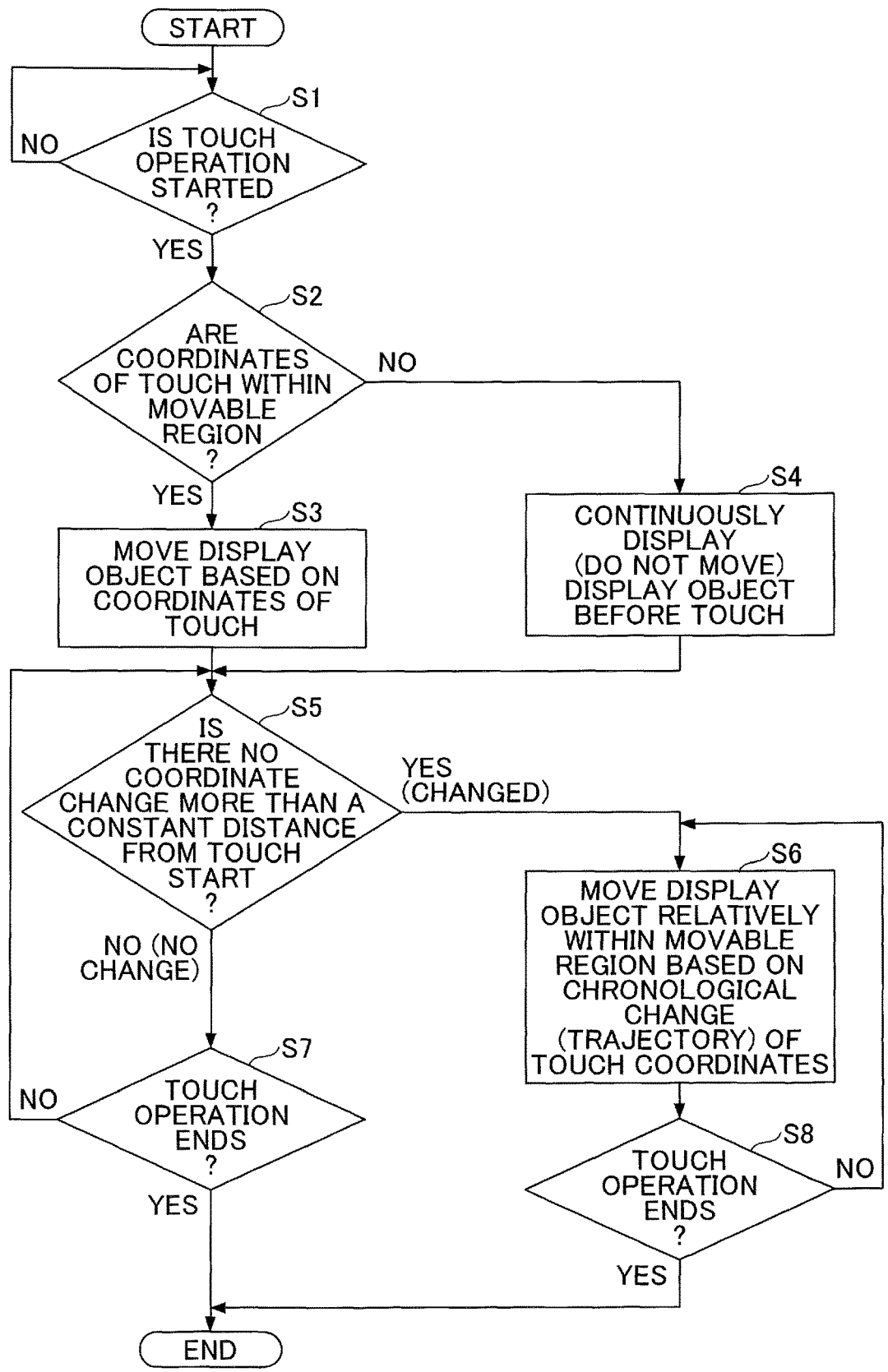
FIG. 5 is a flowchart for explaining a movement control of the display object in response to a touch operation in the first embodiment.

Referring to FIG. 5, an object moving method according to the first embodiment will be described. FIG. 5 is a flowchart for explaining a movement control of the display object 113C in response to the touch operation according to the first embodiment.

In step S1, the touch detection part 11 (touch panel 115) detects whether or not the indicator 20 is in proximity or in contact with the image display LCD 113, that is, whether or not the touch operation starts (detection step). The touch detection part 11 detects a state of a proximity or a contact with a predetermined sampling period, and calculates coordinates touched by the touch panel control device 114 every time. Before a start of the touch operation (step S1: NO), the display object 113C is displayed on the display coordinates at an end of a previous touch operation. When the touch operation is started (step S1: YES), the operation determination part 12 determines whether or not the touched coordinates are coordinates in the movable region 113B of the display object 113C (step S2).

When touch start coordinates are coordinates in the movable region 113B (step S2: YES), the display object 113C is moved based on absolute coordinates, which are touched (step S3). When a touch operation is terminated without changing the coordinates by a certain amount or more from the start coordinates (almost not moving) (step S5: YES and step S7: YES), that is, when a tap operation is performed, the position designation of the display object 113C is completed at the coordinates moved in step S3. That is, in a flow of step S3→step S5→step S7, the movement pattern from the screen 9a to the screen 9b in FIG. 3A is obtained.

However, when there is a coordinate change of a certain amount or more from the touch start coordinates (step S5: NO), that is, when a drag operation is performed, the display object 113C is moved relatively within the movable region 113B from the coordinates moved in step S3 based on the chronological change (trajectory) of the continuous touch coordinates (step S6), and a position designation is completed at coordinates where the display object 113C is displayed at an end of the touch operation (step S8: YES). That is, in a flow of step S3→step S5→step S6→step S8, a movement pattern is depicted on the screen 9c to the screen 9d in FIG. 3B.

In a case in which the touch operation start coordinate is not within the movable region 113B (step S2: NO), the display object 1130 is not moved from the coordinate before the touch operation is started (step S4). When the touch operation is terminated without any coordinate change of a certain amount or more from the touch start coordinates (almost not moving) (step S5: YES and step S7: YES), that is, when the tap operation is performed, the position designation of the display object 113C is completed at the coordinates before the touch operation is started. That is, in a flow of step S4→step S5→step S7, the state displayed on the screen 9e in FIG. 3C is maintained after the touch operation is terminated.

However, when the coordinate change is conducted with a certain amount or more from the touch start coordinates (step S5: NO), that is, when the drag operation is performed, the display object 113C is moved relatively within the movable region 113B based on the continuous chronological change (trajectory) of the touch coordinates from the coordinates before the start of the touch operation (step S6), and the position designation is completed at the coordinates where the display object 113C is displayed at a time when the touch operation ends (step S8: YES). That is, in a flow of step S4→step S5→step S6→step S8, a movement pattern is represented on the screen 9e to the screen 9f in FIG. 3C.

Among the above described flowcharts, in a flow of step S3→step S5→step S7 and a flow of step S4→step S5→step S7, a process of the operation determination part 12 and a process of the first movement control part 13 are conducted. The operation determination part 12 determines that the input operation on the image display LCD 113 is a tap operation, based on a detection result of the touch operation by the touch detection part 11 (the determination step). The first movement control part 13 moves the display object 113C to tapped coordinates when the coordinates of the tap operation are within the movable region 113B, and does not move the display object 113C to tapped coordinates when the coordinates of the tap operation are within the movable region 113B (first movement step).

However, in a flow of step S3→step S5→step S6→step S8 and a flow of step S4→step S5→step S6→step S8, another process of the operation determination part 12 and a process of the second movement control part 14 are conducted. The operation determination part 12 determines that the input operation to the image display LCD 113 is determined to be a drag operation based on the detection result of the touch operation by the touch detection part 11. The second movement control part 14 moves the display object 113C within the movable region 113B based on the coordinate change of the drag operation in the detectable region 113A (second movement step).

Advantages of the first embodiment will be described. Conventionally, in a configuration for a movement operation to move the display object 113C by a touch operation on the touch panel 115 at a portable device such as the digital camera 100, a range allowed for the touch operation is limited to the movable region 113B of the display object 113C. Therefore, even in a case in which the touch operation is performed on the detectable region 113A of the touch panel 115, when the touch operation is outside the movable region 113B, the touch operation is not accepted, and the movement of the display object 113C is stopped. Hence, there is a problem, in which an operability of the movement operation of the display object 113C is deteriorated.

On the contrary, in the display device 10 of the first embodiment, when the display object 113C is moved relatively by the drag operation, it is possible to use the detectable region 113A, which is wider than the movable region 113B, as a range for a touch operation, and it is also possible to restrict, within the movable region 113B, a displaying of the display object 113C. By the above described movement control, because the problem in the conventional configuration is eliminated, it is possible to improve the operability of the movement operation of the display object 113C, and to consequently improve the operability of the touch operation of the user.

Second Embodiment

Figure 6:
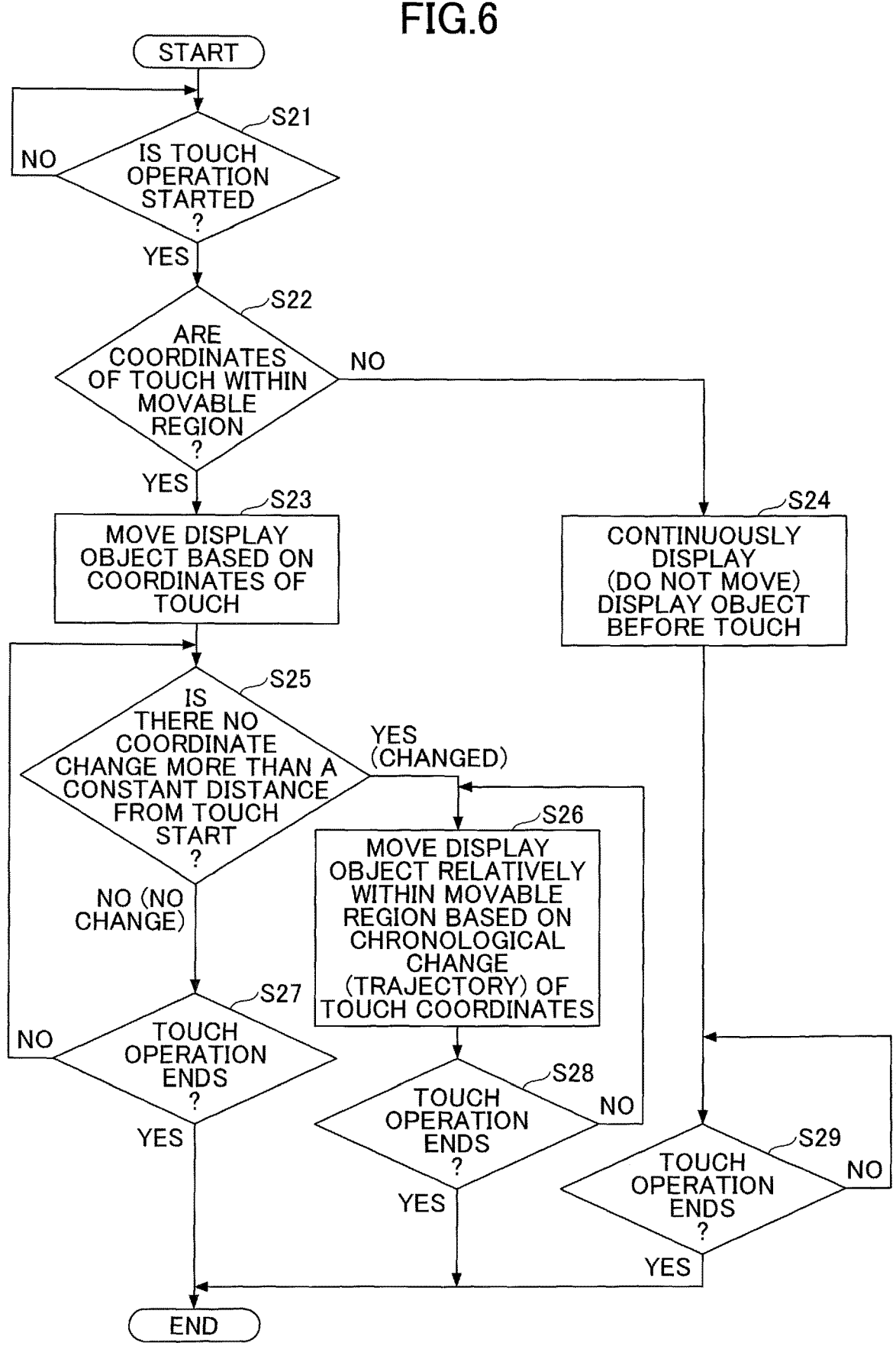
FIG. 6 is a flowchart for explaining a movement control of a display object in response to a touch operation in a second embodiment.

A second embodiment will be described with reference to FIG. 6. FIG. 6 is a flowchart for explaining a movement control of the display object 113C in response to a touch operation according to the second embodiment.

The flowchart in FIG. 6 is basically the same as that in FIG. 5, and each process of step S21 to step S28 in FIG. 6 is the same as each process of step S1 to step S8 in FIG. 5.

Different from a control flow in FIG. 5, in a control flow in FIG. 6, in a case in which the coordinates of the start of a touch operation are not within the movable region 113B (step S21: YES and step S22: NO), even when a subsequent operation is one of a tap operation and a drag operation, the subsequent operation is regarded as an invalid operation, and the display object 113C is not changed (in the flow in FIG. 5, the tap operation is an invalid operation; however, the drag operation moves the display object relatively). That is, in step S24, after a continuous display (not moving) process is conducted to remain the display object 113C at coordinates before the start of the touch operation, a process in the second embodiment ends at a time when the touch operation ends (step S29: YES) while the display object 113C remains at the coordinates before a start of the touch operation.

That is, in the second embodiment, the second movement control part 14 also includes a function, which does not move the display object 113C in a case in which start coordinates of the drag operation are outside the movable region 113B. In the flowchart of FIG. 6, in a flow from step S24 to step S29, when coordinates of the tap operation are outside the movable region 113B, the first movement control part 13 (the LCD control device 112) does not move the display object to the coordinates, and when the coordinates of the drag operation are outside the movable region 113B, the second movement control part 14 (the LCD control device 112) does not move the display object to the coordinates.

Third Embodiment

A third embodiment will be described with reference to FIG. 7 to FIG. 9. In the third embodiment, in the movement control of the display object 113C in the first and second embodiments, a display/non-display of the movable region 113B is controlled.

Figure 7A:
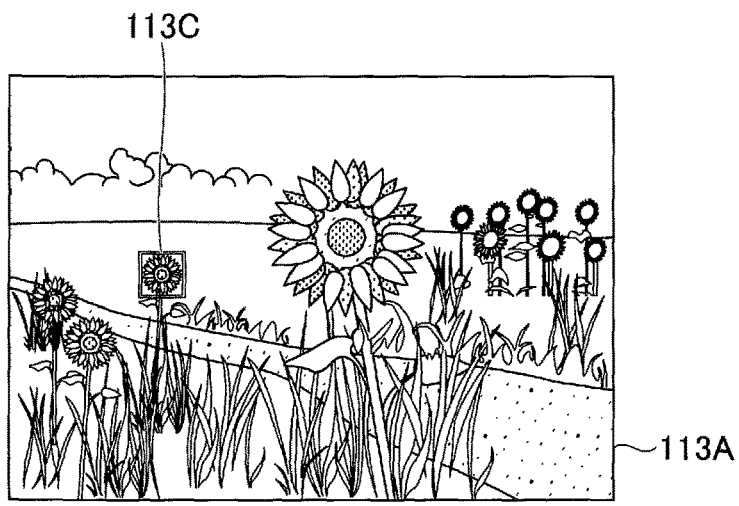
FIG. 7A is a diagram illustrating an example of a screen without displaying a movable region.
Figure 7B:
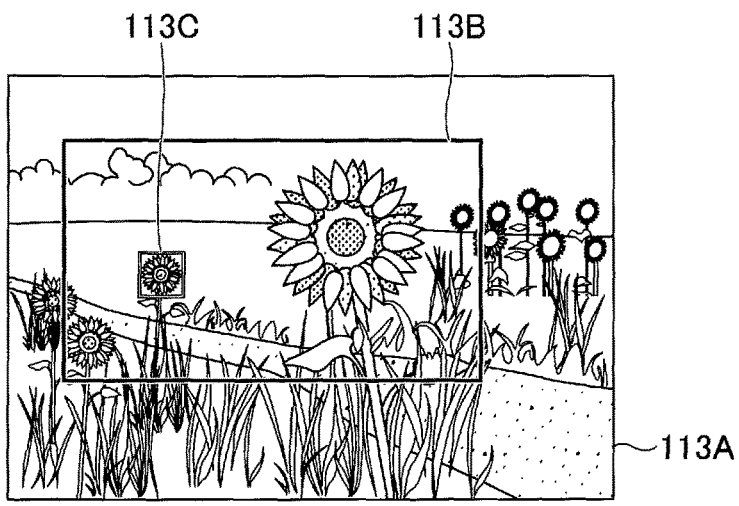
FIG. 7B is a diagram illustrating an example of the screen with displaying the movable region.
Figure 7C:
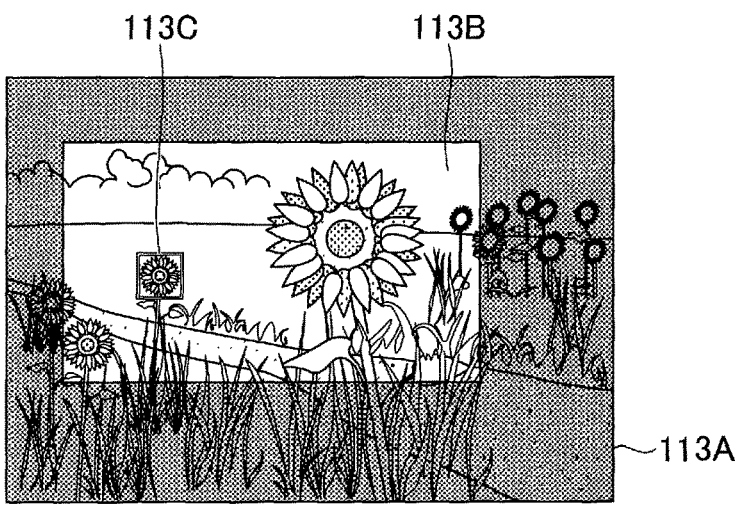
FIG. 7C is a diagram illustrating another example of the screen with displaying the movable region.

FIG. 7A through FIG. 7C are diagrams illustrating display examples of the movable region 113B. FIG. 7A is an example of a screen without displaying the movable region 113B. FIG. 7B and FIG. 7C are examples of the screen with displaying the movable region 113B. As illustrated in FIG. 7A through FIG. 7C, the display object 113C (AF frame) is displayed regardless of whether the movable region 113B is displayed. There may be various patterns: a display pattern for displaying a boundary as illustrated in FIG. 7B, and a display pattern for filling a region outside the movable region 113B; however, a display style is preferable in that the display object 113C is displayed without being hindered in any case. In addition, in a case of filling the movable region 113B depicted in FIG. 7C, it is preferable that a transmission color is used so as not to hinder an overall confirmation of a subject image.

Figure 8:
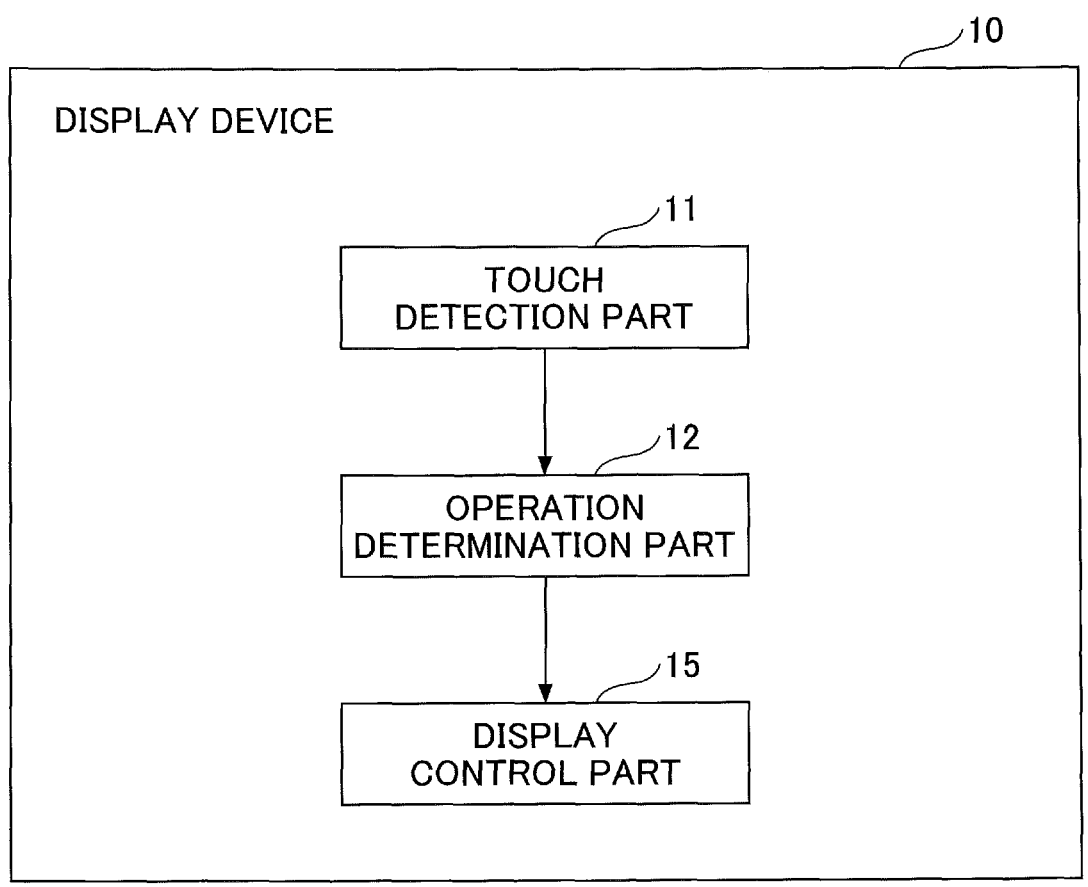
FIG. 8 is a functional block diagram illustrating a display device according to a third embodiment.

FIG. 8 is a functional block diagram illustrating the display device 10 according to the third embodiment. In a third embodiment, the display/non-display of the movable region 113B is controlled during the touch operation to satisfy such a requirement of the movable region 113B as described above. The display device 10 in the third embodiment includes a touch detection part 11, an operation determination part 12, and a display control part 15 as functions for realizing the above described display process for the movable region 113B, as illustrated in FIG. 8.

Because the touch detection part 11 and the operation determination part 12 are the same as those in the first embodiment, explanations thereof will be omitted.

The display control part 15 displays the movable region 113B when an input operation is performed outside the movable region 113B. Meanwhile, according to the input operation performed in the movable region 113B, it is controlled not to perform a display representing the movable region 113B. More specifically, the display representing the movable region 113B is performed when a drag operation is performed in the movable region 113B, and the display representing the movable region 113B is not performed when a tap operation is performed in the movable region 113B. When there is no input operation, the display representing the movable region 113B is not performed.

The display control part 15 is implemented by the LCD control device 112 illustrated in FIG. 1.

Figure 9:
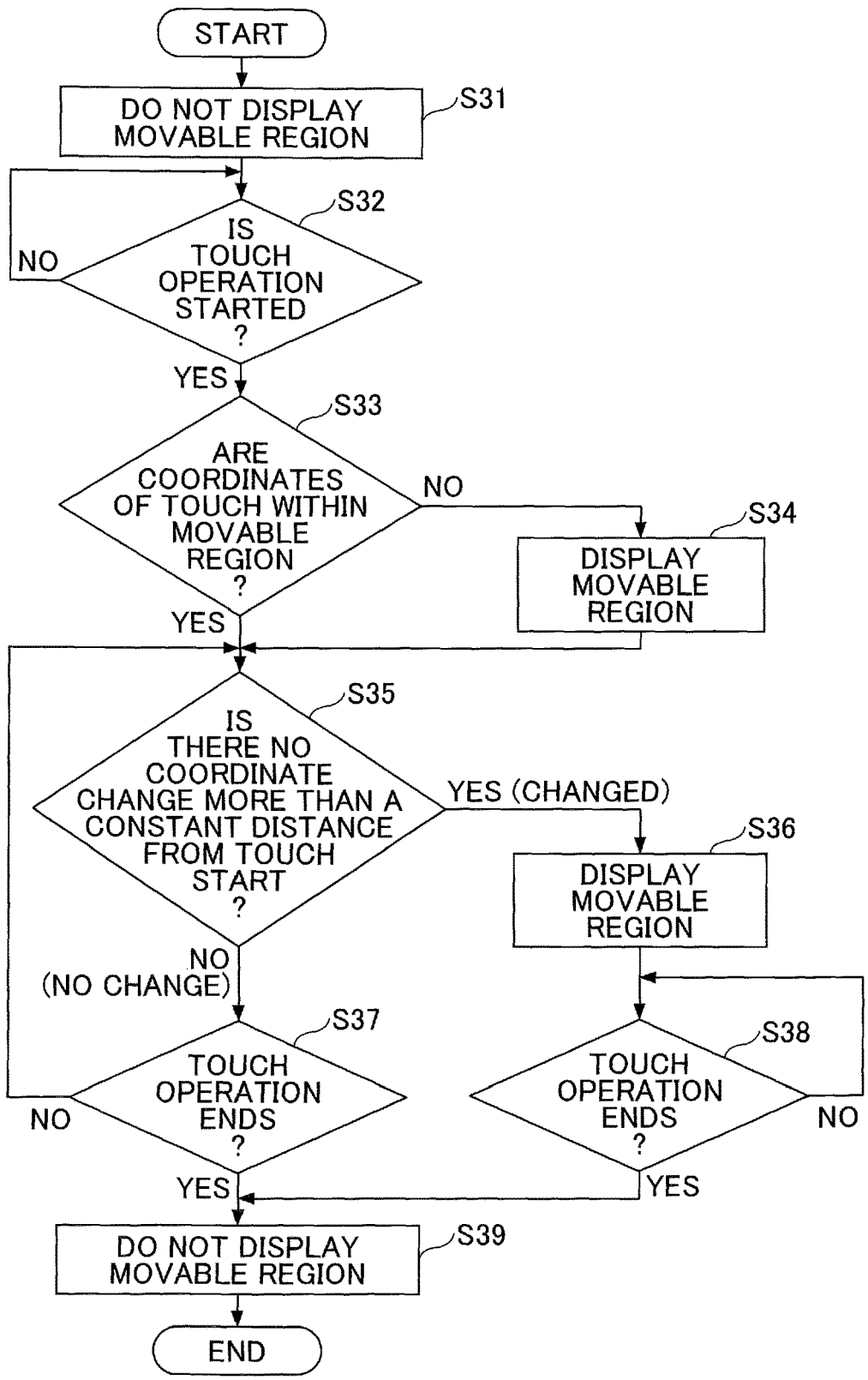
FIG. 9 is a flowchart illustrating display control of a movable region according to the third embodiment.

FIG. 9 is a flowchart illustrating display control of the movable region 113B according to the third embodiment.

In step S31, before the touch detection part 11 detects a touch operation, that is, when there is no input operation, the display control part 15 (the LCD control device 112) controls the movable region 113B not to be displayed (second non-display step). When a touch operation is started (step S32: YES), it is determined whether or not touched coordinates are in the movable region 113B for the display object 113C (step S33).

When the touch operation is performed outside the movable region 113B (step S33: NO), the movable region 113B is displayed by the display control part 15 (step S34: display step). The display pattern of the movable region 113B may be, for example, a boundary display depicted in FIG. 7B or a filled display outside movable region 113B depicted in FIG. 7C.

Meanwhile, when touching inside the movable region 113B (step S33: YES), when the touch operation is terminated without a coordinate change of a certain amount or more from the touch start coordinates (step S35: YES and step S37: YES), in other words, when the tap operation is performed, the movable region 113B remains not to be displayed (step S39: first non-display step), and this control flow is terminated.

When there is the coordinate change of a certain amount or more from the touch start coordinates (step S35: NO), that is, when a drag operation is performed, even in a case in which the touch start coordinates are inside or outside the movable region 113B (both YES and NO in step S33), the movable region 113B is displayed during the drag operation (step S36). At a time when the touch operation ends (step S38: YES), a mode is switched to a non-display mode in that the movable region 113B is not displayed (step S39) and this control flow is terminated.

In the third embodiment, the display control is conducted such that the movable region 113B is not displayed in a case of moving the display object 113C by absolute coordinates due to the tap operation conducted in the movable region 113B, and the movable region 113B is displayed only in an operation where it is considered necessary to notify that the touch operation is conducted outside the movable region 113B. By these advantages, it is possible to solve the problem caused in a case of always displaying the movable region 113B, that is, it is possible to solve the problem in that the display becomes complicated and confirmation of a subject is hindered. By these advantages, it is possible to improve operability of the touch operation with respect to the AF area on a touch panel. Also, it is possible to preferably notify the movable region 113B of the display object 113C when the display object 113C is moved in accordance with a touch operation of a user.

Moreover, the display control of the movable region 113B in the third embodiment is used in combination with the movement control of the display object 113C in accordance with a touch operation in the first embodiment and the second embodiment, so that the operability of the touch operation of the user is further improved.

Fourth Embodiment

Figure 10:
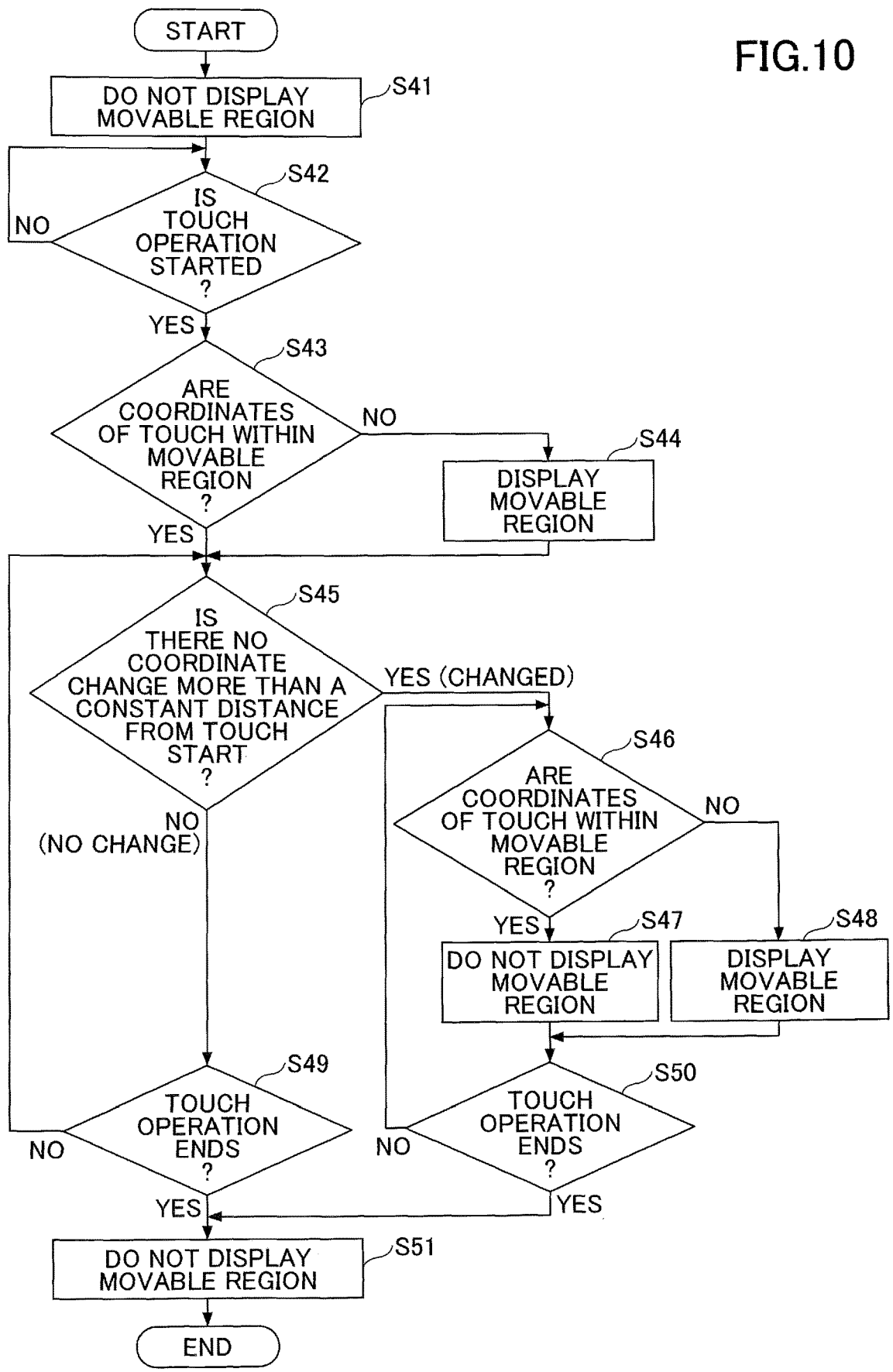
FIG. 10 is a flowchart for explaining a display control of a movable region according to a fourth embodiment.

A fourth embodiment will be described with reference to FIG. 10. FIG. 10 is a flowchart for explaining a display control of the movable region 113B according to the fourth embodiment. The flowchart of FIG. 10 is basically the same as the flowchart of FIG. 9 in the third embodiment, and the processes in step S41 to step S45, step S49, and step S51 in FIG. 10 are the same as the processes in step S31 to step S35, step S37, and step S39 in FIG. 9.

In the flowchart depicted in FIG. 10, during the drag operation, when the touch coordinates are outside the movable region 113B (step S46: NO), the display control part 15 displays the movable region 1133 (step S48), and when the touch coordinates are within the movable region 113B (step S46: YES), the display control part 15 does not display the movable region 113B (step S47).

In the fourth embodiment, in addition to the display control of the third embodiment, in a case in which a drag operation, which started outside the movable region 113B, enters inside the movable region 113B, a mode is switched to a non-display mode in that the movable region 113B is not displayed. By this display control, it is possible to display the movable region 113B while restricting, with higher accuracy, to an operation, which requires a report of that the operation is conducted outside the movable region 113B.

Fifth Embodiment

Figure 11:
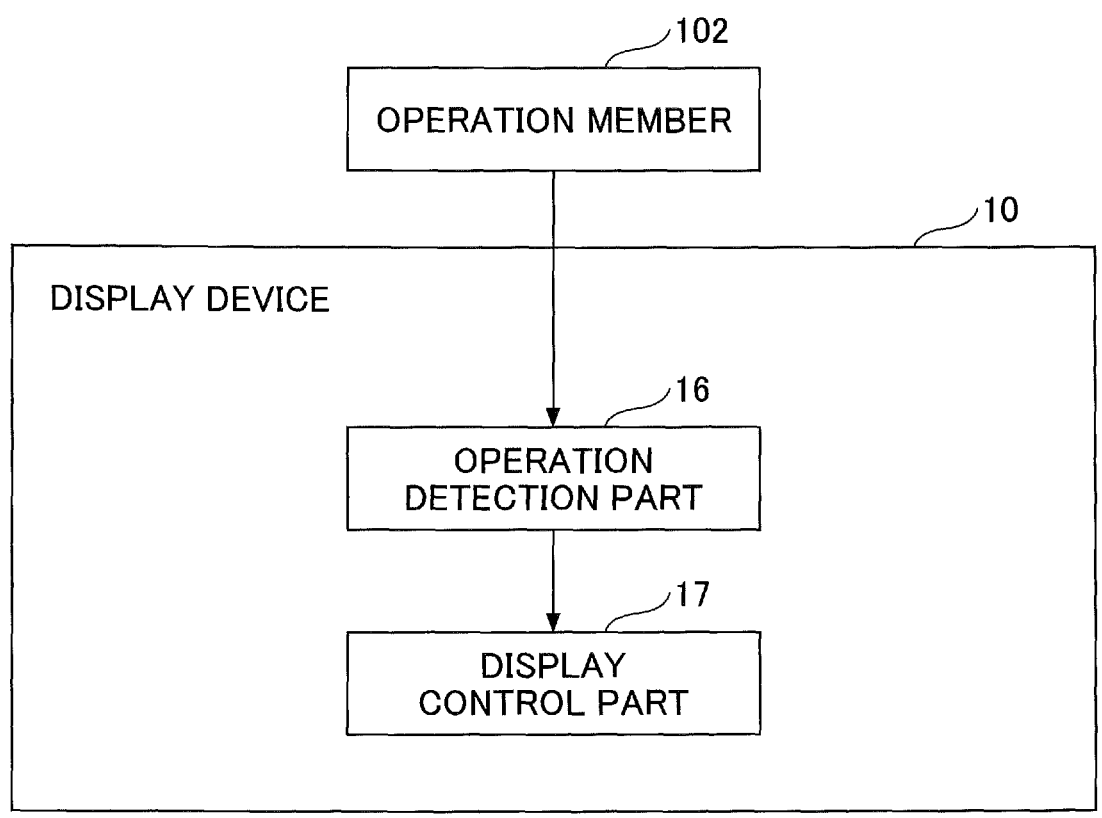
FIG. 11 is a diagram illustrating an example of a functional configuration of a display device according to a fifth embodiment.

A fifth embodiment will be described with reference to FIG. 11 and FIG. 12. FIG. 11 is a diagram illustrating an example of a functional configuration of a display device 10 according to the fifth embodiment. In the fifth embodiment, the user moves and manipulates the display object 113C using the operation member 102. In this case, because an outside of the movable region 113B is not directly pointed as the touch operation does, display control of the movable region 113B is different from the display control (FIG. 7 and FIG. 8) at a time of the touch operation in the third embodiment and the fourth embodiment.

In the fifth embodiment, according to a movement instruction of the display object 113C entered by the operation member 102, a display indicating a movable region 113B is performed. The display device 10 according to the fifth embodiment includes an operation detection part 16 and a display control part 17 as functions for realizing the above described display process of the movable region 113B, as illustrated in FIG. 10.

The operation detection part 16 detects a movement instruction of the display object 113C entered by the operation member 102. Here, the operation member 102 is an operating member that is used for directional instructions such as, for example, a crosshair key or an 8-direction lever. These operating members may be provided with an ability to retain a direction of a movement (an operation of pressing and holding the crosshair key, an operation of turning and holding the 8-direction lever).

The display control part 17 controls the display/non-display of the movable region 113B based on the movement instruction detected by the operation detection part 16.

The operation detection part 16 and the display control part 17 are implemented by the LCD control device 112 illustrated in FIG. 1.

Figure 12:
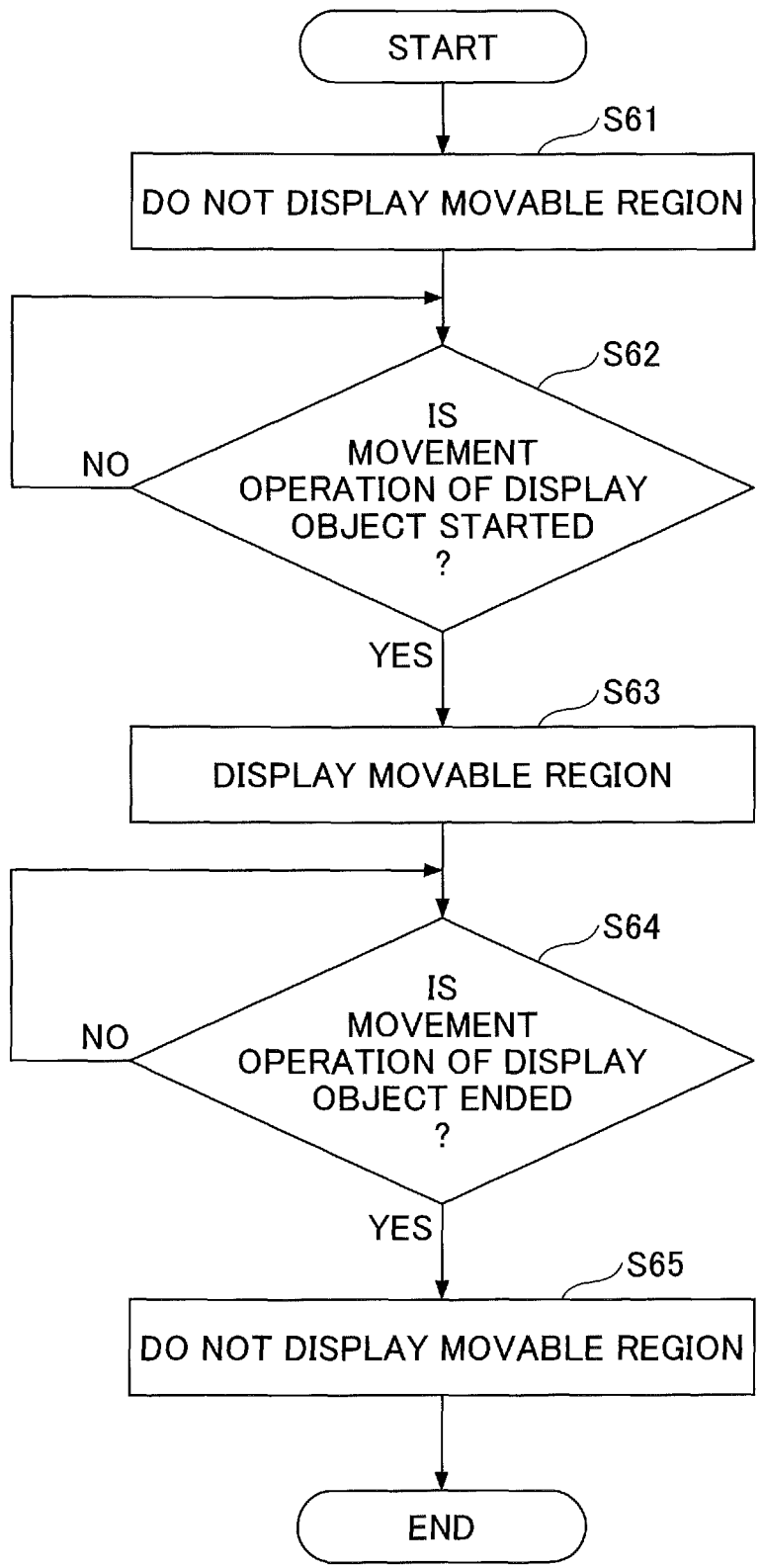
FIG. 12 is a flowchart for explaining display control of a movable region in the fifth embodiment.

FIG. 12 is a flowchart for explaining the display control of the movable region 113B in the fifth embodiment. The movable region 113B is not displayed (non-display state) before an input of the movement operation is detected by the operation detection part 16, because the display object 113C is disposed in the movable region 113B (step S61). When a start of the movement operation of the display object 113C is detected by the operation detection part 16 in step S62

(YES in step S62), the movable region 113B is displayed by the display control part 17 (step S63). While the movement operation is continuously conducted (NO in step S64), when the movable region 113B is continuously displayed, and then, the movement operation is completed (YES in step S64), a mode is switched to a non-display mode in that the movable region 113B is not displayed (step S65), and this control flow ends.

That is, in the fifth embodiment, the movable region 113B is displayed during an operation for retaining a movement direction instruction, and the movable region 113B is not displayed in a case in which a movement instruction operation is not performed. In the fifth embodiment, because a display of the movable region 113B is restricted during the movement operation, it is possible to solve the problem in that the display becomes complicated and confirmation of a subject is hindered.

Sixth Embodiment

Figure 13:
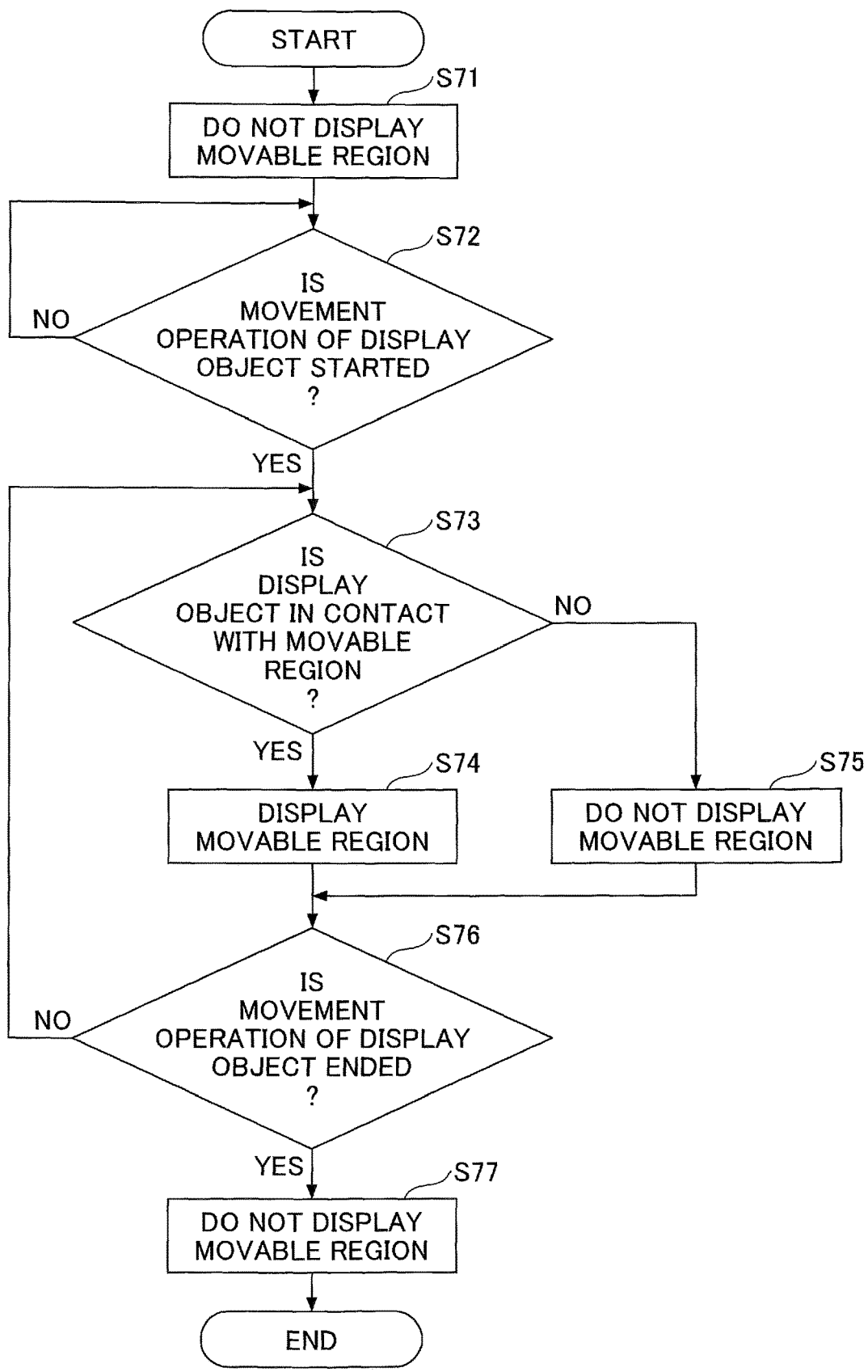
FIG. 13 is a flowchart for explaining display control of a movable region in a sixth embodiment.

A sixth embodiment will be described with reference to FIG. 13. FIG. 13 is a flowchart for explaining display control of the movable region 113B according to the sixth embodiment.

In the sixth embodiment, in a case in which a position, at which the display object 113C moves in accordance with a movement instruction entered by the operation member 102, is a position adjacent to a boundary of the movable region 113B, a display representing the movable region 113B is performed. In addition, in a case in which the display object 113C is not in contact with a boundary of the movable region 113B, a display representing the movable region 113B along a movement instruction is not performed.

Processes of step S71, step S72, step S76, and step S77 in FIG. 13 are similar to those of step S61, step S62, step S64, and step S65 in FIG. 12.

In the flowchart of FIG. 13, when a start of the movement operation is detected by the operation detection part 16 (YES in step S72), the display control part 17 determines in step S73 whether or not the display object 113C is in contact with a boundary portion of an outer edge of the movable region 113B. When the display object 113C abuts the boundary of the movable region 113B during an operation of retaining a movement direction instruction (YES in step S73), the display control part 17 switches to a display mode for displaying the movable region 113B (step S74). Meanwhile, even during the operation for retaining the movement direction instruction, when the display object 113C is not in contact with the boundary of the movable region 113B (NO in step S73), the movable region 113B is not displayed by the display control part 17 (step S75).

In the sixth embodiment, it is possible to display the movable region 1133 by restricting to an operation, which is highly necessary to notify that the operation is about to go outside the movable region 113B because the movable region 113B is not displayed before the operation is conducted and the display object 113C becomes in contact with the boundary of the movable region 113B. Therefore, it is possible to solve the problem in that the display becomes complicated and confirmation of a subject is hindered in a case of always displaying the movable region 113B.

Seventh Embodiment

Figure 14:
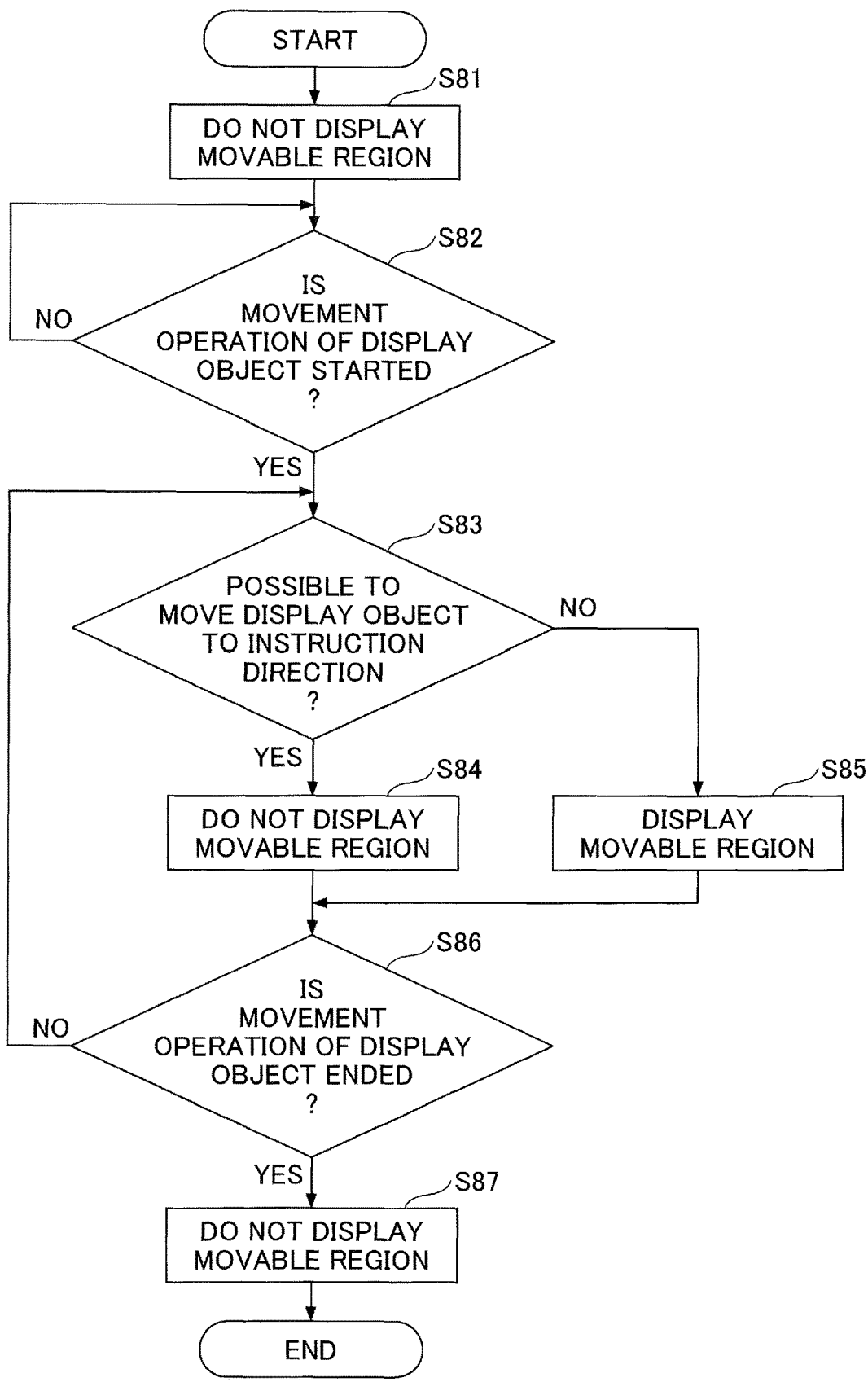
FIG. 14 is a flowchart for explaining display control of a movable region in a seventh embodiment.

A seventh embodiment will be described with reference to FIG. 14. FIG. 14 is a flowchart for explaining display control of the movable region 113B in the seventh embodiment.

In the seventh embodiment, in a case in which the display object 113C can be moved in accordance with a movement instruction input by the operation member 102, a display representing the movable region 113B in accordance with the movement instruction is not performed.

Processes of step S81, step S82, step S86, and step S87 in FIG. 14 are similar to those of step S71, step S72, step S76, and step S77 in FIG. 13.

In the flowchart of FIG. 14, when a start of the movement operation is detected by the operation detection part 16 (YES in step S82), the display control part 17 determines in step S83 whether or not the display object 1130 can be moved to an instruction direction. When the display object 113C cannot move to the instruction direction during the operation of holding the movement direction instruction (NO in step S83), the display control part 17 switches to a display mode for displaying the movable region 113B (step S85). However, when the display object 113C can be moved to the instruction direction by the display object 113C even during the operation of holding the movement direction instruction (YES in step S83), the movable region 113B is retained by the display control part 17 so as not to be displayed (step S84).

In the seventh embodiment, it is possible to display the movable region 113B by restricting to an operation, which is highly necessary to notify that the operation is about to go outside the movable region 113B because the movable region 113B is not displayed before the operation is conducted and the display object 113C is unable to move to the instruction direction. Therefore, it is possible to solve the problem in that the display becomes complicated and confirmation of a subject is hindered in a case of always displaying the movable region 113B.

As described above, the seventh embodiment has been described with reference to the specific examples. However, the present disclosure is not limited to the first through seventh embodiments. The first through seventh embodiments, to which design modifications have been made from time to time by those skilled in the art, are also encompassed by the present disclosure as long as they possess the features of the present disclosure. The elements provided in each of the first through seventh embodiments described above, and the arrangement, conditions, shape, and the like thereof, may be adapted and modified from time to time without being limited to those exemplified. Each element provided by each of the above described first through seventh embodiments may vary in combination as appropriate, unless there is a technical inconsistency.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a processor such as a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An imaging device, comprising;
a display device, comprising:
a memory; and
a processor coupled to the memory, and configured to perform a process including
displaying a display object on a display part,
controlling a display on the display part,
detecting a proximity or a contact of an indicator with the display part, and
determining an input operation to the display part based on a detection result in the detecting,
wherein the display includes
a first region that is a detectable region in the detecting,
a second region that is a part of the first region and is a movable region where the display object moves in accordance with the input operation including a tap operation or a drag operation, said tap operation being detected by detecting that a coordinate of the tap operation does not change by more than a predetermined value, and
wherein in a case in which the determining determines the tap operation on the display part,
the controlling moves the display object to coordinates of the tap operation upon detecting the coordinates that are in the second region, and does not move the display object toward coordinates of the tap operation upon detecting the coordinates that are outside the second region, and
in a case in which the determining determines the drag operation on the display part,
the controlling moves the display object within the second region in accordance with a coordinate change due to the drag operation within the second region and does not move the display object upon detecting that a coordinate at which the drag operation starts is outside the second region, wherein
the first region corresponds to an imaging range,
the second region corresponds to a range capable for focusing, and
the display object corresponds to a focusing area frame.

2. The imaging device as claimed in claim 1, wherein the controlling includes
enabling a display of the second region in response to the input operation that is conducted outside the second region,
disabling the display of the second region in response to the input operation that is conducted inside the second region, and
disabling the display of the second region during the input operation not being conducted.

3. The imaging device as claimed in claim 2, wherein the controlling further includes
enabling the display of the second region in response to the drag operation that is conducted inside the second region, and
disabling the display of the second region in response to the tap operation that is conducted inside the second region.

4. The imaging device as claimed in claim 2, wherein the process further includes inputting a movement instruction of the display object,
wherein the controlling displays the second region in response to the movement instruction that is input with respect to the display object.

5. The imaging device as claimed in claim 4, wherein the controlling further includes, in response to the movement instruction with respect to the display object,
enabling the display of the second region in a case of a position that is in contact with a boundary of the second region, the position to move the display object; and
disabling the display of the second region in response to the movement instruction in a case of the case of position that is not in contact with the boundary.

6. The imaging device as claimed in claim 4, wherein the controlling further includes
disabling the display of the second region in response to the movement instruction in a case of the display object that is able to be moved in accordance with the movement instruction.

7. An object moving method by a display device of an imaging device, comprising:
displaying a display object on a display part,
controlling a display on the display part,
detecting a proximity or a contact of an indicator with the display part, and
determining an input operation to the display part based on a detection result in the detecting,
wherein the display includes
a first region that is a detectable region in the detecting,
a second region that is a part of the first region and is a movable region where the display object moves in accordance with the input operation including a tap operation or a drag operation, said tap operation being detected by detecting that a coordinate of the tap operation does not change by more than a predetermined value, and
wherein in a case in which the determining determines the tap operation on the display part,
the controlling moves the display object to coordinates of the tap operation upon detecting the coordinates that are in the second region, and does not move the display object toward coordinates of the tap operation upon detecting the coordinates that are outside the second region, and
in a case in which the determining determines the drag operation on the display part,
the controlling moves the display object within the second region in accordance with a coordinate change due to the drag operation within the second region and does not move the display object upon detecting that a coordinate at which the drag operation starts is outside the second region, wherein
the first region corresponds to an imaging range,
the second region corresponds to a range capable for focusing, and
the display object corresponds to a focusing area frame.

8. A non-transitory computer-readable recording medium storing a program which causes a display device of an imaging device to perform a process comprising:
  displaying a display object on a display part,
  controlling a display on the display part,
  detecting a proximity or a contact of an indicator with the display part, and
  determining an input operation to the display part based on a detection result in the detecting,
  wherein the display includes
    a first region that is a detectable region in the detecting,
    a second region that is a part of the first region and is a movable region where the display object moves in accordance with the input operation including a tap operation or a drag operation, said tap operation being detected by detecting that a coordinate of the tap operation does not change by more than a predetermined value, and
  wherein in a case in which the determining determines the tap operation on the display part,
    the controlling moves the display object to coordinates of the tap operation upon detecting the coordinates that are in the second region, and does not move the display object toward coordinates of the tap operation upon detecting the coordinates that are outside the second region, and
  in a case in which the determining determines the drag operation on the display part,
    the controlling moves the display object within the second region in accordance with a coordinate change due to the drag operation within the second region and does not move the display object upon detecting that a coordinate at which the drag operation starts is outside the second region, wherein
  the first region corresponds to an imaging range,
  the second region corresponds to a range capable for focusing, and
  the display object corresponds to a focusing area frame.

* * * * *